United States Patent Office 3,408,327
Patented Oct. 29, 1968

3,408,327
CONDENSATION OF PHENOLS WITH
DITHIOL POLYTHIOETHERS
Yves Labat, Gelos, France, assignor to Societe Nationale
des Petroles d'Aquitaine, Paris, France
No Drawing. Filed May 5, 1966, Ser. No. 547,788
Claims priority, application France, May 12, 1965,
16,666, Patent 1,443,325
13 Claims. (Cl. 260—48)

ABSTRACT OF THE DISCLOSURE

There is provided a novel process for the preparation of sulphur containing phenoplasts which comprises heating a phenol with a dithiol polythioether in the presence of an acidic catalyst.

---

The present invention relates to a process for the preparation of condensation products of phenols with dithiol polythioethers. It also covers the new products thus obtained and particularly the new phenoplasts which contain sulphur.

The preparation of condensation products of phenols, formaldehyde and hydrogen sulphide has long been known. It is more particularly known to prepare resins which are based on sulphur, phenol and formaldehyde. Nevertheless, the known products are not well-defined and the use thereof as plastic materials has not met with any great success, the properties of these materials not being of very great interest.

The present invention, on the contrary, makes it possible to obtain materials which are much better defined and of which the properties are of interest for a certain number of uses. The new condensation products do in fact make possible the preparation of thermohardenable materials having properties comparable with those of phenol-formaldehyde resins. The invention permits the preparation of fusible resins which are partially soluble in the usual organic solvents and in alkaline solutions. It is possible to cause the content of sulphur in these products to vary from about 20 to about 50%.

The new process according to the invention consists in causing a dithiol polythioether to react with one or more phenols so as to condense these two reactants with discharge of hydrogen sulphide, in the presence of an acid as catalyst.

The phenothioplasts themselves and a process for preparing them are disclosed and claimed in my co-pending application Ser. No. 426,429 filed Jan. 18, 1965. An alternate process for preparing these phenothioplasts which comprises activating the phenol by addition of a basic substance and thereafter continuously introducing into the mixture the dithiolpolythioether is disclosed and claimed in my co-pending application Ser. No. 541,972 filed Apr. 12, 1966.

In practice, according to one particular embodiment of the invention, the dithiol polythioethers which are used are of the $HS(CH_2S)_nH$ type, in which the number $n$ of groups is generally between 2 and 7. These dithiol polythioethers are preferably liquid oligomers which are of greater or lesser viscosity at ordinary temperature. Particularly good results are obtained with dithiol polythioethers which contain a small proportion of oxygen, particularly 0.05 to 2% by weight, preferably 0.1 to 0.5% and preferably under the form of hydroxyl groupings.

The particularly convenient method of application consists in using liquid oligomers in which $n$ has a value from 3 to 4 and of which the molecular weight is in the region of 190 to 200.

The condensation according to the invention of the phenols with the aforementioned liquid oligomers is carried out at temperatures which vary from 45° to 180° C., and usually between 140° and 160° C.

The condensation is effected with anhydrous reactants taken in the form of a liquefied mixture.

Although the acids in general are suitable as catalysts for the condensation according to the invention, it is nevertheless preferred to use salts having an acid character or metalloid halides, particularly compounds of the type of Friedel-Crafts catalysts or Lewis acids. Thus, the condensation can be catalysed by an acid as for example HCl, para-toluosulphonic acid or other strong protonic acids, but it is effected much more quickly when the catalyst is formed by a halide of acid character, of which the electronically deficient central atom is an electron acceptor. Particularly suitable for use are the halides of the elements of the Groups I–B, II–A, and B, III–A and B, IV–A, V–A, VI–B, V–II–A or VIII of the Periodic System of the Elements; lanthanides and uranides may be suitable as the salts having an acid character. Particular examples of halides capable of being used with advantage are those such as $FeCl_3$, $AlCl_3$, $SnCl_4$, $CdCl_2$, $ZnCl_2$, $BF_3$, etc. Very active catalysts systems are formed by the aforementioned compounds in solution in an organic acid, this solution being simply acidified by means of a strong acid; as a result, excellent catalysts are formed by acetic solutions containing hydrochloric acid, of which the concentration may be up to saturation point.

Among the catalytic systems according to the invention, anhydrous zinc chloride in solution in pure acetic acid, activated by the introduction of gaseous and dry HCl, deserves particular mention. The catalytic activity of this system is sufficiently strong for very small proportions thereof to be sufficient for quickly and effectively condensing the dithiol polythioether oligomer with phenol; actually, the catalytic action is already very apparent from 0.001 mol of $ZnCl_2$, per mol of phenol. Another very active catalytic system comprises boron fluoride in solution in anhydrous acetic acid.

In general, the condensation according to the invention can be carried out with proportions of catalyst which are for example from 0.0005 of 0.01 mol of active compounds per mol of phenol being used; with the preferred catalyst systems indicated above, this proportion generally varies between 0.001 and 0.005 mol per mol of phenol. The catalyst may be introduced all at once at the start of the condensation or even introduced portion-wise or continuously during a certain period of the polymerisation.

The use of acid catalysts in accordance with the present invention leads to certain differences with respect to the condensation of the same reactants in the presence of basic catalysts as previously described in my co-pending application Ser. No. 426,429, filed Jan. 18, 1965. Thus, when the resin has been prepared with an acid catalyst, its soluble fabrication in the organic solvents shows a very small proportion of sulphur. The condensation requires a proportion of acid catalyst less than that of basic catalyst; it is more rapid with the former and can be more easily effected in a single step. In addition, the acid catalysts enable a higher rate of phenol conversion to be obtained, particularly a conversion of about 95%, as compared with 85% in the case of the basic catalysts, without there being any need to fear the formation of a thermoset rubbery mass.

The process according to the present invention has permitted resins to be obtained which show an improved suitability for molding; there is in fact obtained a more rapid and more complete baking during the cross-linking which leads to thermosetting.

The new resins according to the present invention permit of moulded objects to be obtained which show an excellent resistance to heat deformation, that is to say, a resistance to bending under fairly high load. These resins may moreover be prepared, in accordance with one of the modifications of the new process, so as to contain only a very small percentage of trithiane.

In the same way as with the manufacture of phenolformaldehyde condensation products, different phenols can be used, but above all those of which the ortho and/or para positions are free, that is to say, unsubstituted phenols. Thus, phenols such as hydroxybenzene, metacresol, para-cresol, alkyl phenols, for example, those of which the alkyl radical contains 2 to 4 carbon atoms, resorcinol, etc., are suitable for carrying out the present invention.

It is possible in practice to condense variable quantities of dithiol polythioether on phenol; these quantities can for example be 0.5 to 1 mol per mol of phenol, preferably 0.75 to 0.9, this corresponding to a molar ratio between phenol and oligomer of 1.1 to 1.32.

Consequently, one particular feature of the invention consists in working with a slight phenol excess or with a quantity of oligomer at most stoichiometrically equal to that of the phenol, taking into account all the reactive positions of the phenol, i.e. the unsubstituted ortho-, para- and/or meta-positions. It is possible in this way to avoid having, on completing the reaction, a too large quantity of phenol which has not reacted; on the other hand, the danger of obtaining products containing homopolymerised oligomer chains is suppressed, as is also that of the formation of a three-dimensional lattice. The use of a slight excess of phenol thus avoids the conditions liable to lead to products which cannot be used as moulding powders.

Furthermore, it is advantageous to stop the condensation reaction when about 95% of the phenol have been condensed. If the reaction is continued beyond this limit, a resin which can set under heat is obtained and this solidifies in the reactor.

The duration of the reaction is regulated as a function of the quantity of liberated hydrogen sulphide; the release of H$_2$S ceases when the reaction of the terminal SH-groups of the oligomer with the hydrogen of the phenolic nucleus is complete. This duration is generally of the order of 60 to 200 minutes and usually between 100 and 160 minutes.

The process according to the invention can with advantage be carried out in accordance with two variants. In the first, which will be called "Process A" in the following description, the phenol is melted and then the catalyst is added thereto, followed by all the dithiol polythioether; the temperature is then progressively raised to a constant value which is below the boiling point of the phenol and the mixture is kept at this temperature for the time required to obtain the transformation of about 95% of the phenol being used; the condensation is thus carried out in a single step. This working method enables excellent moulding powders to be obtained which contain very little trithiane.

According to another variant, referred to as "Process B," the molten phenol, activated with a small portion of catalyst, is brought to he condensation temperture, which is below the boiling point of the phenol; firstly the dithiol polythioether and secondly the complement of catalyst in solution are then injected continuously or in portions into the activated phenol. This working method thus consists in carrying out the condensation progressively, controlling it by regulating the delivery of dithiol polythioether.

It is obvious that, whatever the working method used, the reaction medium is suitably agitated and, depending on the activity of the catalyst being used and the nature of the resin to be obtained, the molar ratio between phenol and oligomer, the proportion of catalyst, the temperature (usually between 140° and 160° C.) and the condensation period are suitably regulated. In addition to these parameters which are common to both working methods, it is possible in Process A to act on the duration of the rise in temperature after the addition of the oligomer, while in Process B, the speed of incorporation of the oligomer is if necessary caused to vary in suitable manner.

The invention also comprises the hardening of the sulphur phenoplasts obtained by the process described above. This transformation of the resin can be effected by means similar to those which are used in the hardening of the known phenol-formaldehyde resins; in particular, one method of achieving the hardening consists in causing the new sulphur phenoplasts to react with substances which generate active methylene groups, as for example the polymethylene polyamides and more especially hexamethylene tetramine.

The new products according to the invention, obtained by the condensation of a dithiol polythioether

with a phenol, correspond to the formula:

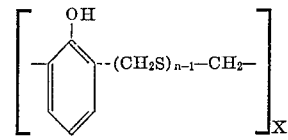

which represents one of the units of the condensation product, this unit being repeated $x$ times in the molecule of the resin which is obtained. These compounds no longer contain an uncombined SH function, each molecule being terminated by two mono-substituted phenolic rings. The number $x$ can assume high values, but it is generally between 1 and 6, according to the degree of condensation. The number $(n-1)$ of groups —CH$_2$S— in the said unit is from 1 to 6 when starting with oligomers of which $n$ is 2 to 7 and when the condensation takes place in a single hydrogen atom of the phenol, without homopolymerisation of the oligomer. When other positions of the phenol intervene, particularly the para and/or meta positions, and in the case of the homopolymerisation of the dithiol polythioether—this taking place particularly if this latter is in excess with respect to the phenol—, the number of —CH$_2$S— groups per unit can be much larger, for example 7 to 32.

The new condensation products obtained by the process according to the invention are generally hard resinous compositions, the majority of which can easily be ground.

Also belonging to the present invention are the hardened resins of which the overall composition is that of the condensation products described above, but in which all or part of the free ortho and/or para positions of the phenolic rings present are substituted by other groupings, particularly methylene groupings.

The new condensation products according to the invention can be used for the manufacture of moulded ob-

EXAMPLE 1.—Process B

A stainless steel 5-litre reactor is used, this being equipped with a thermometer, an oligomer inlet, a catalyst inlet (by means of proportioning pumps), a two-position condenser (reflux and ordinary) a stirrer device and an opening for the introduction of phenol. The reactor is immersed in a thermostatically controlled heating jacket.

1504 g. phenol (16 mols of monohydroxybenzene) are caused to melt in the reactor which is thermostatically controlled at 50° C. There are then added 8 ml. of a catalyst solution obtained by a solution of 30 g. of pure anhydrous $ZnCl_2$ in 100 ml. of pure acetic acid being saturated with gaseous HCl (catalyst solution No. 1). Thus, 0.001 mol of $ZnCl_2$ were added per mol of phenol.

The temperature of the assembly is brought to 150° C. and the thioformol oligomer on the one hand and the catalyst solution on the other hand are continuously incorporated.

Thus, in 130 minutes, there are added:

14 molecules of oligomer $HS(CH_2S)_nH$ with $n$ approximately 3.6, of a molecular weight in the region of 200, containing 0.10% of oxygen in the form of $—SCH_2OH$ groupings.

24 ml. of the catalyst solution (as supplement) or a total of 0.004 mol of $ZnCl_2$ per mol of phenol.

The phenol which has not reacted is then distilled.

The results obtained are indicated in Table I.

TABLE I

| Example No. | 1 | 2 |
|---|---|---|
| Phenol in mols | 16 | 16 |
| Oligomer in mols | 14 | 8 |
| Catalyst solution No | 1 | 1 |
| Mol of $ZnCl_2$ per mol of phenol | 0.001 +0.003 | 0.001 +0.0026 |
| Temperature of condensation stage in °C | 150 | 150 |
| Period for the incorporation of the oligomer in minutes | 130 | 75 |
| $H_2S$ liberated in mols | 25 | 15.5 |
| Rate of conversion of phenol in percent | 95 | 52.5 |
| Average sulphur in crude resin in percent | 36 | 29 |
| Fraction of the crude resin: | | |
| Soluble fraction: | | |
| Content of trithiane in percent | 13.5 | 12 |
| Percent in the benzene | 36 | 71 |
| Its content in S, percent | 26.5 | 24 |
| Percent in acetone | 23 | 14 |
| Its content in S, percent | 21 | 16 |
| Insoluble fraction, percent | 27.5 | 3 |
| Its content in S, percent | 40.5 | 41 |

EXAMPLE 2.—Process B

It is carried out in accordance with the procedure of Example 1. The details and the analytical results are grouped in Table I.

EXAMPLE 3

In a glass 1-litre reactor, there is applied the working method of Example 1, using boron fluoride in solution in acetic acid as catalyst.

2 molecules of phenol (188 g.) are melted at 45–50° C. in the reactor. 4.5 ml. of a 4% solution of $BF_3$ in acetic acid are added and the temperature is brought to 145° C. 2 mols of dithiol polythioether oligomers containing 0.22% of hydroxyle groupings are then added continuously and in 155 minutes, the said polythioether being the same as in the previous example, and also a supplementary 3.5 ml. of catalyst solution are added.

3.3 mols of $H_2S$ are liberated in 160 minutes. A resin is obtained which contains 46% of sulphur and the rate of conversion of the phenol is 96%.

EXAMPLE 4.—Process A 2 mols of phenol (188 g.) are caused to melt in a glass reactor which is identical with that of Example 3. 0.0085 mol of anhydrous tin chloride ($SnCl_4$) is added to the phenol at 50–60° C. 1.5 mols of oligomer (300 g.), containing 0.22% of OH groups, are then added. The temperature is raised progressively so as to pass from 80° C. to 150° C. in 30 minutes. At 150° C. the temperature is fixed. In 120 minutes, 2.8 mols of $H_2S$ have been liberated; the conversion rate of the phenol is then 93%.

EXAMPLE 5.—Process A 16 mols of phenol are caused to melt in a 5-litre stainless steel reactor equipped with a stirrer device, a thermometer, an opening for the introduction of reactants, a control viscometric probe and a two-position condenser (reflux and ordinary) and the temperature is brought to about 80° C.

21 ml. of the catalyst solution No. 1 (described in Example 1) are added, that is to say, 0.00268 mol of $ZnCl_2$ per mol of phenol being reacted.

12 mols, i.e. 2400 g. of dithiol polythioether oligomer containing 0.22% of OH groups, are then added. The temperature is then brought progressively to 150° C. so as to pass from 80 to 150° C. in 30 minutes. The temperature is then stabilised at 150° C. In 120 minutes, 24 mols of $H_2S$ are liberated and the phenol conversion rate is 93%.

After the uncombined phenol has been distilled in vacuo, there are collected about 3 kg. of resin, containing 33% of sulphur and 4.3% of trithiane.

EXAMPLES 6 to 11.—Process A

Table II sets out the working conditions and the results obtained in a series of condensation tests according to Process A at 150° C. and over a period of 120 minutes.

TABLE II

| Example No. | 6 | 7 | 8 | 9 | 10 | 11 |
|---|---|---|---|---|---|---|
| Mols of dithiopolythioether: | | | | | | |
| $n$ | 3.6 | 3.6 | 3.6 | 3.6 | 3.6 | 3.6 |
| Moles | 12 | 12 | 12 | 12 | 12 | 10.5 |
| OH, percent | 0.22 | 0.22 | 0.22 | 0.22 | 0.22 | 0.22 |
| Mols of monohydroxybenzene | 16 | 16 | 16 | 16 | 16 | 12 |
| Catalyst solution No | 1 | 1 | 2 | 1 | 1 | 1 |
| Quantity of catalyst in mol of $ZnCl_2$ per mol of phenol | 0.00280 | 0.00280 | 0.00268 | 0.00268 | 0.00265 | 0.00370 |
| Period in minutes of the rise in temperature from 80 to 150° C | 50 | 25 | 30 | 30 | 30 | 30 |
| Phenol conversion rate, percent | 95 | 96 | 80 | 93 | 90.6 | 95 |
| $H_2S$ liberated in mols | 23.5 | 24 | 23.3 | 24 | 22.5 | 20 |
| Average sulphur in percent in the resin, after distillation of the remaining phenol | 32 | 34 | 34 | 33 | 34 | 40 |
| Fractions of resin soluble: | | | | | | |
| Trithiane content, percent | 4.4 | 4.0 | 6.3 | 4.3 | 5.1 | 4 |
| Percent in benzene | 16 | 11.4 | 43 | 17 | 50.3 | 20.3 |
| Its content of S, percent | 18.5 | 17.5 | 12.5 | 16.5 | 14 | 15.5 |
| Percentage in acetone | 30.5 | 18.2 | 15.3 | 40 |  | 15.6 |
| Its content of S, percent | 12.5 | 12 | 10.8 | 12 | 10.2 | 13 |
| Insoluble fraction, percent | 49 | 66.4 | 36.4 | 38.7 | 40.4 | 60.2 |
| Its content of S, percent | 44.5 | 42.5 | 62 | 58 | 56 | 55.5 |

Note.—The catalyst solution No. 1 is described in Example 1. Solution No. 2 is a solution of 15 g. of $ZnCl^2$ in 100 ml. of acetic acid, saturated with HCl.

EXAMPLES 12 TO 21

These examples are carried in the same working conditions as Example 9, i.e.: catalytic solution No. 1 utilisation; temperature duration to raise from 80° C. to 150° C., 30 mn.; reaction duration, 120 mn.

TABLE III

| Example No. | 12 | 13 | 14 | 15 | 16 | 17 | 18 | 19 | 20 | 21 |
|---|---|---|---|---|---|---|---|---|---|---|
| Reactor utilised (Idem Example—) | 5 | 12 | 12 | 12 | 12 | (¹) | 12 | (²) | 19 | 19 |
| Dithiolpolythioether $HS(CH_2S)_n$—H: | | | | | | | | | | |
| $n$ | 3.8 | 3.8 | 3.6 | 3.8 | 3.8 | 3.2 | 3.2 | ³2 | ³3 | ³4 |
| Percent OH | 0.25 | 0.23 | 0.17 | 0.14 | 0 | 0 | 0.20 | 0.22 | 0.22 | 0.22 |
| Mols | 9 | 12 | 9 | 9 | 12 | 1.5 | 9 | 0.375 | 0.375 | 0.375 |
| Mols of monohydroxybenzene | 12 | 16 | 12 | 12 | 16 | 2 | 12 | 0.50 | 0.50 | 0.50 |
| Quantity of catalyst in mol of $ZnCl_2$ per mol of phenol | 0.00252 | 0.00255 | 0.00320 | 0.00334 | 0.00450 | 0.00510 | 0.00280 | 0.00272 | 0.00272 | 0.00284 |
| Phenol conversion rate, percent | 92 | 91 | 94 | 91 | 75 | 94 | 93 | 93 | 92 | 90 |
| $H_2S$ liberated in mols | 18 | 22.5 | 18 | 17 | 19 | 3 | 18 | 0.75 | 0.75 | 0.72 |

¹ 1 litre glass balloon.   ² 250 cm.³ glass balloon.   ³ Pure.

NOTE.—It is seen that by lowering the number of "$n$" in the dithiolpolythioether oligomer the resins' fluidity and their ability to accept loads are improved.

EXAMPLE 22

Cross-linking experiments with hexamethylene tetramine were carried out on resins obtained in Examples 1 to 21; these operations, as well as the moulding, were carried out in known manner, as practised on thermosetting resins. Initial cross-linking of 1000 g. of resin with 120 g. of hexamethylene tetramine was carried out in a mixer under heat. The moulding powder obtained, which may or may not be loaded with the usual fillers, is subjected to the moulding operation under the conditions known for phenol-formaldehyde resins.

Electrical and mechanical tests were carried out.

(a) The resin of Example 6 (100 parts) is mixed with 2.5 parts of zinc stearate and 12 parts of hexamethylene tetramine serving as cross-linking agent. The powder, obtained by grinding this mixture, is moulded at 160° C. under a pressure of 250 kg./cm.² The bending temperature under load is 150° C. and the volumetric resistivity is $5 \times 10^{14}$ ohm. cm. on standardised test elements.

(b) Same test as before, but 30 parts of wood flour are incorporated at the instant of mixing; on the object moulded under the same conditions, the bending temperature under load is 145° C. and the volumetric resistivity is $1 \times 10^{14}$ ohm. cm.

(c) The test (b) carried out with the resin obtained in Example 1 gave a bending temperature under load of 100° C. and a volumetric resistivity of $2 \times 10^{11}$ ohm. cm.

I claim:

1. Process for the preparation of novel phenoplasts containing sulphur which comprises the steps of heating a dithiol polythioether which is a liquid oligomer of the $HS(CH_2S)_nH$ type, in which $n$ has a value of from 2 to 7, with a phenol in the anhydrous liquid state at a temperature of from 45° to 180° C. in the presence of an acidic catalyst whereby there is effected a condensation with liberation of hydrogen sulfide.

2. Process according to claim 1, characterised in that the oligomer has a molecular weight of the order of 190 to 200, $n$ being in the region of 3 to 4.

3. Process according to claim 1, characterised in that the phenol used has at least one unsubsituted ortho and/or para position.

4. Process according to claim 3, characterised in that the phenol is hydroxybenzene, meta-cresol, paracresol, ethyl, propyl or butylphenol, or resorcinol.

5. Process according to claim 1, characterised in that the catalyst is a Lewis acid.

6. Process according to claim 5, characterised in that the Lewis acid is a halide of Fe, Al, Sn, Cd, Zn or B.

7. Process according to claim 1, characterised in that the condensation is carried out between 140° and 160° C.

8. Process according to claim 7, characterised in that the condensation period is 60 to 200 minutes, and the reaction is carried out with agitation.

9. Process according to claim 1, characterised in that the proportion of dithiol polythioether is from 0.5 to 1 mol per mol of phenol.

10. Process according to claim 8 wherein the condensation period is between 100 to 160 minutes.

11. Process according to claim 9 wherein the proportion of dithiol polythioether is from 0.75 to 0.9 mol per mol of phenol.

12. Process according to claim 6 wherein the halide is $ZnCl_2$.

13. Process according to claim 1 wherein the dithiol polythioether contains from about 0.05 to about 2% of oxygen.

No references cited.

WILLIAM H. SHORT, *Primary Examiner.*

H. SCHAIN, *Assistant Examiner.*